United States Patent Office 3,261,885
Patented July 19, 1966

3,261,885
PRODUCTION OF BLOCK-GRAFT COPOLYMERS FROM POLYOLEFINES AND SYNTHETIC POLYAMIDES
Hans Craubner, Karlsruhe, and Gerhard Illing, Neuleiningen, Pfalz, Germany, assignors, by mesne assignments, to H. Roemmler G.m.b.H., Hesse, Germany
No Drawing. Filed Oct. 6, 1961, Ser. No. 143,292
Claims priority, application Germany, Oct. 7, 1960, B 59,664
7 Claims. (Cl. 260—857)

This invention relates to a process for the production of block-graft copolymers produced from polyolefines and synthetic polyamides, i.e., a new kind of copolymer in which polyolefine chains and polyamide chains or blocks, i.e., segments of polyolefine chains and of polyamide chains, are grafted onto each other.

According to a proposal for the nomenclature in the field of macromolecular compounds (Makr. Ch. 38 (1960, 1), graft polymers are branched polymers in which the side chains are structurally different from the main chain. According to the same proposal, block polymers are linear polymers in whose polymer chains segments which are built up of different types of monomers are arranged in series, each segment containing a large number of identical monomer units in polymerized form. By block-graft copolymers we understand polymers in which blocks or chains of other types of polymers or polycondensates with the monomer units B are grafted onto polymer chains with the monomer units A, and whose polymer chains AAA ... may additionally contain blocks of other types of copolymers or polycondensates. Such block-graft polymers may be illustrated, for example, by the following general formula:

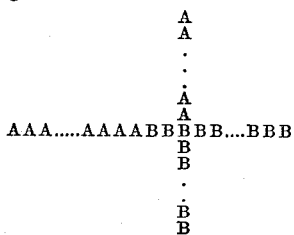

It is an object of this invention to provide a process for the production of block-graft copolymers from synthetic polyolefines and synthetic polyamides. Another object of the invention is to provide a process for the production of a new thermoplastic composition of matter from polyolefines and synthetic polyamides which has improved properties as compared with the well-known polyolefines and polyamides used as starting materials.

We have found that block-graft copolymers can be prepared by homogenizing mixtures of polyolefines and synthetic polyamides at temperatures between about 50° and 350° C., preferably between about 150° and 300° C., with the addition of from 0.05 to 10% by weight of free radical forming catalysts.

The term "polyolefines" as used in this specification refers to high molecular weight polymers which can be prepared in conventional manner, for example, by the well known processes of high-pressure and low-pressure polymerization, from monoolefines containing from 2 to 4 carbon atoms, such as ethylene, propylene, and butylenes, such as isobutylene, butene-1 and butene-2. They may have a linear, branched or, to a slight degree, cross-linked structure.

Polymers of styrene obtainable by the conventional and well-known processes of block, suspension or emulsion polymerization are also useful in forming block-graft copolymers in combination with polyamides according to the process of the present invention. Further, the polymers, for example of ethylene, propylene and styrene, may also contain, polymerized-in to the extent of up to 50% by weight based on the weight of the copolymer, other olefinically unsaturated monomers, for example dienes, such as butadiene and isoprene, acrylic or methacrylic acid and/or their derivatives, such as acrylonitrile, acrylamide, methacrylamide, methyl, ethyl, propyl, butyl, 2-ethylhexyl, decyl and tridecyl esters of acrylic or methacrylic acid, vinyl halides, such as vinyl chloride and vinylidene chloride, vinyl esters, such as vinyl acetate and vinyl propionate, vinylaromatic compounds, such as styrene, α-methylstyrene, and vinyltoluenes and vinyl ethers, such as vinyl isobutyl ether.

Such polyolefines and other polymers described in the two preceding paragraphs as initial reactants conveniently have melt indexes at 190° C. of between 0.05 and 25, preferably between 0.1 and 20 grams per 10 minutes. The preferred polyolefines for the process according to this invention are high molecular weight polyethylenes produced by the well-known processes of high-pressure and low-pressure polymerization and polypropylene produced by the well-known Ziegler polymerization process or any modifications of this process. The polyolefines suitable as starting materials and the processes for their production are well known in the art.

The term "synthetic polyamides" as used in this specification includes especially linear polyamides containing —NHCO— groups in the main chain. They can be prepared in conventional manner from lactams containing 6 to 12 carbon atoms in the lactam ring, such as caprolactam, oenanthic lactam, caprylic lactam and lauric lactam, or from linear aliphatic dicarboxylic acids containing 6 to 17 carbon atoms, such as adipic acid, suberic acid, sebacic acid or heptadecanedicarboxylic acid, and organic diamines containing 6 to 13 carbon atoms, especially linear aliphatic diamines containing 6 to 12 carbon atoms between the amino groups, such as hexamethylene diamine, octamethylene diamine, decamethylene diamine and dodecamethylene diamine, araliphatic diamines, such as 1,4-di-(aminomethyl)-benzene, cycloaliphatic diamines, such as 1,4-di-(aminomethyl)-cyclohexane and 4,4'-diaminodicyclohexylmethane. Such polyamides in general have melt indexes at 240° C. between 0.4 and 50, preferably between 1 and 40 grams/10 minutes. Polyamides of this type and processes for their production are well known in the art.

Free radical forming catalysts which are suitable for the process according to this invention are especially those which decompose at temperatues between 50° and 350° C. into radicals having an average life of about 10 seconds to 20 minutes, preferably about 10 seconds to 5 minutes, particularly organic peroxides, for example cumene hydroperoxide, dicumyl peroxide, tertiary butyl hydroperoxide, di-tertiary butyl peroxide, 2,5-di-tertiary butyl peroxy-2,5-dimethyl-hexane, dibenzoyl peroxide, lauroyl peroxide, tertiary butyl perbenzonate, and also azo-bisnitriles, such as azo-bis-isobutyronitrile and azo-disulfonates. According to this invention, these free radical forming catalysts may also be used in the form of their solutions in suitable solvents, for example, benzene, toluene, xylene, dioxane, cyclohexane, butanone, dimethylformamide, carbon tetrachloride and tetrahydrofurane. Organic peroxides of the above-mentioned type are preferred as free radical forming catalysts.

Inorganic peroxides, for example, hydrogen peroxide, sodium peroxide and ammonium persulfate, are also suitable as catalysts. The free radical forming catalysts are used according to this invention in amounts of from 0.05 to 10, preferably 0.1 to 5% by weight, based on the total weight of all components, i.e., the sum of the weights of the polyolefines, polyamides and catalysts.

The components of the said kind are homogenized at temperatures between 50° and 350° C. in conventional homogenization machines. By "homogenization" or "homogenizing" we understand a thorough, intense mixing of the components under conditions where high shear stresses prevail, particularly intense kneading. Especially suitable machines for homogenization are one-shaft or multi-shaft screw extruders and also kneaders, further refiners and calenders which have a plurality of pairs of rollers. In such machines, high shear stresses occur in the gaps formed by the boundary surfaces which are moved relatively to each other, for example, by the wall of the extruder chamber and the screw in extruders or by the cylinder wall and the discs in multi-shaft disc kneaders. These shear stresses may amount to $1.0 \times 10^3$ kg./cm.$^2$ or more. Machines of the said type are the better suited to the process according to this invention the greater the shear stresses attainable therein. The speed gradients G in general lie between 10 and 2000 seconds$^{-1}$ or above. Multi-shaft disc kneaders are preferably used for the process.

The relative proportions of polyolefines and synthetic polyamides may be varied within wide limits in the process according to this invention. The amount of polyamide lies in general between 0.95 and 98.95% by weight inclusive, based on the total weight of the mixture. The preferred amount of polyamide includes 2.95 to 98.95% by weight, based on the total weight of the mixture. The amount of polyolefines in general lies between 99 and 1 inclusive, preferably between 97 and 1% by weight inclusive, based on the total weight of the mixture. For example, modified polyolefines through which nitrogen passes less readily than through unmodified polyolefines are obtained by homogenizing polyolefines according to this invention in admixture with about 5% by weight of polyamide. On the other hand, modified polyamides whose dyeability and water absorption are decreased as compared with unmodified polyamides are obtained by homogenizing polyamides according to this invention with about 1.0% by weight of polyolefines. By the process according to the invention products are obtained which are distinguished by especially advantageous mechanical properties, by intensely mixing, with the addition of free radical forming catalysts, mixtures of 30 to 75% by weight of high-pressure or low-pressure polyethylene, and 24.95 to 69.95% by weight of polyhexamethylene adipamide or of 35 to 65% by weight of high-pressure or low pressure polyethylene and 64.95 to 34.95% by weight of polyhexamethylene adipamide or of 20 to 80% by weight of polypropylene and 79.95 to 19.95% by weight of polycaprolactam or of 30 to 70% by weight of polypropylene and 69.95 to 29.95% by weight of polyhexamethylene adipamide percentages based on the total mixture.

In the process according to this invention, the components may first be premixed in conventional mixing machines, for example, propeller mixers, and supplied via conventional metering devices, such as shaking troughs, conveyor belts, metering worms and batch-weighing scales, to the machines in which the reaction is to be carried out. The components may also be supplied separately to the homogenizing machines. The process may be carried out batchwise or, with advantage, also continuously. Additives, such as pigments, fillers, dyes, and stabilizing agents which do not react under the conditions of the homogenization with the free radical forming catalysts used, may also be added to the components.

By means of this process, block-graft copolymers can be prepared in a simple way which have the valuable properties of the different types of high molecular weight initial components, or whose properties have been modified in an advantageous way as compared with those of the unmodified polyamides of polyolefines. For example, solubility properties, softening range, water absorption, gas permeability, dyeability, printability, stability to aging, stress corrosion behavior and the mechanical and electrical properties may be improved. The block-graft copolymers obtained have thermoplastic properties and their structure probably corresponds substantially to the general formula given at the beginning of this specification. In addition, unmodified linear polyamides and polyolefines are probably present in the mixture. A small amount of crosslinked polyamides and polyolefines may also be present. In other words, the process according to this invention yields a new thermoplastic and homogeneous composition of matter with improved properties as compared with the polyolefines and polyamides used as starting materials.

The products are valuable raw materials which can be processed by the usual methods, for example by injection molding, extrusion, melt spinning or deep drawing into shaped articles, such as threads, fibers, bristles, sheets, films, household articles, machine parts, such as gears and casings, and also in some cases into adhesives or lacquers.

The invention is illustrated by, but not limited to, the following examples in which the parts and percentages are by weight. The K-values given are determined according to H. Fikentscher, Cellulose-Chem. 13 (1932), page 58.

EXAMPLE 1

1 part of di-tertiary butyl peroxide is sprayed in a propeller mixer within about 10 seconds onto 20 parts of technical polycaprolactam with the K-value 73. Then 80 parts of technical high-pressure polyethylene having the density 0.918 g./cc. and at 240° C. the melt index 2 g./10 minutes, is added within 30 seconds and the whole further mixed for 5 to 10 seconds. Then the mixture is supplied continuously to a commercially available two-shaft disc kneader and homogenized therein for about 40 to 50 seconds at 240° to 260° C. The reaction product is forced out through a strainer plate and cooled and granulated in the usual way. A block-graft copolymer is obtained which is soluble in xylene at 130° C. up to a residue of 2%. In contrast, unmodified polycaprolactam is practically insoluble in xylene at 130° C. If an attempt is made to homogenize polycaprolactam and polyethylene under the same conditions but in the absence of catalysts, a product is obtained whose polyamide fraction is not dissolved by xylene at 130° C.

Further block-graft copolymers are prepared under the above-mentioned reaction conditions from various amounts of polycaprolactam of the K-value 73 and high-pressure polyethylene of the above-mentioned properties. The properties of the products are given in the following Table I; in the table, the columns are as follows:

A. Weight-ratio of polycaprolactam to polyethylene
B. Density (g./cc.) according to DIN 53,479
C. Melting range in ° C.
D. Water absorption after lying in boiling water for 1 hour (given in percent)
E. Melt index (g./5 minutes at 235° C.) (ASTM D1238-T)
F. Dielectric dissipation factor tan δ at $10^6$ cycles (DIN 53,483)
G. Dielectric constant ε at $10^6$ cycles (DIN 53,482)
H. Tensile strength according to DIN 53,371 (air moist) kg./cm.$^2$

*TABLE I*

| A | B | C | D | E | F | G | H |
|---|---|---|---|---|---|---|---|
| 98:2 | 1.11 | 220–227 | 4.52 | 8.40 | 0.062 | 3.9 | 460 |
| 95:5 | 1.10 | 222–226 | 4.40 | 9.10 | 0.072 | 3.8 | 440 |
| 90:10 | 1.09 | 221–226 | 3.72 | 8.90 | 0.068 | 3.6 | 425 |
| 80:20 | 1.05 | 220–226 | 2.25 | 8.80 | 0.064 | 3.5 | 350 |
| 70:30 | 1.02 | 219–225 | 1.68 | 6.20 | 0.060 | 3.4 | 250 |
| 60:40 | 1.01 | 218–226 | 1.62 | 3.32 | 0.056 | 3.4 | 220 |
| 50:50 | 1.01 | 217–226 | 1.30 | 2.30 | 0.043 | 3.0 | 210 |
| 40:60 | 0.980 | 210–225 | 0.93 | 1.50 | 0.043 | 3.0 | 180 |
| 30:70 | 0.962 | 212–225 | 0.90 | 1.17 | ----- | --- | 175 |
| 20:80 | 0.943 | 184–222 | 0.82 | 0.75 | ----- | --- | 170 |
| 10:90 | 0.927 | 177–200 | 0.57 | 0.54 | ----- | --- | 160 |
| 5:95 | 0.919 | 155–195 | 0.41 | 0.19 | ----- | --- | --- |
| 2:98 | 0.918 | 150–185 | 0.24 | 0.09 | ----- | --- | --- |

EXAMPLE 2

A mixture of 80 parts of technical low-pressure polyethylene with the density 0.960 g./cc. and at 190° C. the melt index 4.8 g./10 minutes, 20 parts of technical polyhexamethylene adipamide with the K-value 72 and 2 parts of cumene hydroperoxide is homogenized in a commercially available two-shaft disc kneader at 270° to 300° C. The residence period in the disc kneader is about 80 seconds. A block-graft copolymer is obtained which has the density 0.978 g./cc., tensile strength 189 kg./cm.$^2$ (according to DIN 53,371) and after lying for an hour in boiling water, a water absorption of 0.4%. It is soluble in boiling xylene down to a residue of 5.5%.

Instead of 2% of cumene hydroperoxide, 3.5% of dicumyl peroxide may be used if homogenization is carried out under otherwise identical conditions for 2 minutes at 280° to 320° C. If 1% of di-tertiary-butyl peroxide is used instead of 2% of cumene hydroperoxide, it is advisable to homogenize for 50 seconds at 260° to 290° C. with the same ratio of polyhexamethylene adipamide to polyethylene. In these cases block-graft copolymers are obtained with practically the same properties as the above-mentioned block-graft copolymer prepared using cumene hydroperoxide as catalyst. The block-graft copolymer obtained by using di-tertiary-butyl peroxide is practically colorless and odorless.

EXAMPLE 3

Mixtures of technical polypropylene with the density 0.892 g./cc. and at 190° C. the melt index 0.42 g./10 minutes, and technical polycaprolactam with the density 1.12 g./cc. and the K-value 72.5 are homogenized in a commercially available two-shaft disc kneader with the addition of 1% of di-tertiary-butyl peroxide at 240° to 260° C. for 40 to 90 seconds.

The properties of the block-graft copolymers obtained with different ratios of polycaprolactam to polypropylene are given in the following Table II in which the columns are:

A. Ratio of polycaprolactam:polypropylene
B. Density in g./cc. according to DIN 53,479
C. Water absorption in % after lying in boiling water for 1 hour
D. Softening range in ° C.
E. Melt index at 220° C. in g./10 minutes
F. Tensile strength in kg./cm.$^2$ according to DIN 53,371

*Table II*

| A | B | C | D | E | F |
|---|---|---|---|---|---|
| 95:5 | 1.11 | 3.95 | 216–224 | 17.7 | 629 |
| 90:10 | 1.10 | 3.70 | 216–224 | 15.9 | 635 |
| 75:25 | 1.05 | 1.86 | 215–221 | 13.5 | 450 |
| 25:75 | 0.94 | 1.04 | 208–217 | 8.3 | 400 |
| 5:95 | 0.92 | 0.59 | 158–162 | 4.1 | 350 |
| 0:100 | ---- | ---- | 164 | ---- | 300 |

A reaction product which has been prepared in otherwise the same way from equal parts of polypropylene of the softening point 128° C. and tensile strength 260 kg./cm.$^2$ and polycaprolactam with the addition of 1% of di-tertiary-butyl peroxide, has the density 1.02 g./cc., a softening range of 160° to 168° C., at 220° C. the melt index 12.1 g./10 minutes, a tensile strength of 380 kg./cm.$^2$ and absorbs 1.23% of water when kept in boiling water for 1 hour.

EXAMPLE 4

A mixture of 95 parts of polycaprylic lactam prepared in the conventional way and having the K-value 76.2, the density 1.11 g./cc. and a melting range of 198° to 203° C., and 5 parts of technical polypropylene having the density 0.896 g./cc., a melting range of 118° to 121° C. and at 190° C. a melt index of 0.38 g./10 minutes is intensely kneaded with 0.5 part of di-tertiary-butyl peroxide in a commercially available two-shaft disc kneader for 40 to 45 seconds at 240° to 260° C.

A block-graft copolymer is obtained which has the density 1.03 g./cc., a melting range of 196° to 201° C. and at 235° C. a melt index of 13.5 g./10 minutes. When kept for 1 hour in boiling water it takes up 1.74% of water and is suitable for example for the production of shaped articles by the injection molding method.

Unmodified polycaprylic lactam with the K-value 76.2 absorbs 4% of water during storage for 1 hour in boiling water.

EXAMPLE 5

A mixture of 90 parts of polyhexamethylene adipamide with the K-value 71.7, 10 parts of polypropylene of the melt index 0.40 g./10 minutes at 190° C., and 0.5 part of azo-di-isobutyronitrile is intensely kneaded in a commercially available two-shaft disc kneader for 80 seconds at 270° to 300° C.

A block-graft copolymer is obtained which has the density 1.07 g./cc. and a melting range of 253° to 261° C. and which during storage for 1 hour in boiling water takes up 3.8% of water.

In contrast, unmodified polyhexamethylene adipamide with the K-value 71.7 and a melting range of 260° to 265° C. absorbs 5.6% of water during storage for 1 hour in boiling water.

EXAMPLE 6

A mixture of 95 parts of a polyamide prepared in the conventional way from hexamethylene diamine sebacate, which has the K-value 69 and a melting range of 220° to 225° C., 5 parts of polypropylene which at 190° C. has the melt index 0.40 g./10 minutes, and 0.5 part of di-tertiary-butyl peroxide is intensely kneaded for 80 seconds at 270° to 300° C. in a commercially available two-shaft disc kneader.

A block-graft polymer is obtained which has the density 1.01 g./cc. and the melting range 212° to 222° C. and which takes up 1.32% of water during storage for 1 hour in boiling water.

In contrast, unmodified polyamide from hexamethylene diamine and sebacic acid with the K-value 69 absorbs 2.7% of water during storage for 1 hour in boiling water and has a melting range of 220° to 225° C.

EXAMPLE 7

45 parts of polystyrene prepared in the conventional way and having the density 1.05 g./cc. and the K-value 66, 10 parts of low-pressure polyethylene having the density 0.961 g./cc. and at 190° C. the melt index 1.0 g./10 minutes, and 45 parts of polycaprolactam which has the density 1.12 g./cc. and the K-value 73 are intensely mixed with the addition of 0.6 part of di-tertiary-butyl peroxide. This mixture is intensely kneaded for about 40 seconds at 240° to 270° C. in a commercially available two-shaft disc kneader. A film-forming thermoplastic mass is obtained which has the density 1.04 g./cc., at 240° C. the melt index 19.6 g./10 minutes, the dielectric constant $\epsilon=3.2$ and at $10^6$ cycles a dielectric dissipation factor tan $\delta=0.048$.

EXAMPLE 8

75 parts of technical polycaprolactam with the density 1.12 g./cc. and the K-value 73.0 and 25 parts of a mixture of 60% polyisobutylene of molecular weight 200,000 and 40% high-pressure polyethylene are intensely mixed with the addition of 1.4 parts of a 70% aqueous solution of cumene hydroperoxide and then intensely kneaded for about 90 seconds at 240° to 270° C. in a commercially available two-shaft disc kneader. A rubber-like, tough, thermoplastic composition is obtained which has the following properties: density 1.04 g./cc.; water absorption 2.26% (after storage for 1 hour in boiling water); softening range 213° to 221° C.; tensile strength 364 kg./cm.$^2$; elongation 20%; melt index at 233° C. 17.9 g./10 minutes;

dielectric constant $\epsilon=3.5$; dielectric dissipation factor tan $\delta=0.057$ measured at $10^6$ cycles.

EXAMPLE 9

90 parts of a copolymer from 27% of acrylonitrile and 73% of styrene with the K-value 70 measured in benzene and 10 parts of polycaprolactam with the K-value 72.5 are intensely mixed with the addition of 1 part of cumene hydroperoxide and then intensely kneaded at 240° to 270° C. for about 120 to 150 seconds in a commercially available two-shaft disc kneader. An opaque, dimensionally stable thermoplastic mass is obtained with the density 1.07 g./cc., a water absorption of 1% (after storage for one hour in boiling water), a softening range of 128° to 132° C. and a melt index at 220° C. of 10.4 g./10 minutes.

We claim:
1. A process for the production of block-graft copolymers which comprises intensely kneading at a shear stress of at least about $1.0 \times 10^3$ kg./cm.$^2$ at a temperature of about 50° C. to 350° C. a mixture of:
   (A) 1 to 99% by weight of a polymer which has a melt index of about 0.05 to 25 g./10 minutes at 190° C. and which is selected from the group consisting of
      (1) homopolymers of 2 to 4 carbon atom monoolefines and styrene, and
      (2) copolymers of said monoolefines and of styrene with up to 50% by weight of other olefinically unsaturated monomers;
   (B) 0.95 to 98.95% by weight of a synthetic linear polyamide containing recurring —NHCO— groups in the main chain and having a melt index of about 0.4 to 50 g./10 minutes at 240° C.; and
   (C) 0.05 to 10% by weight of a free radical forming catalyst selected from the group consisting of organic peroxides, perbenzoates, azo-bisnitriles and azo-disulfonates,
said percentages being based on the total weight of the mixture.

2. A process as claimed in claim 1 wherein component (A) is polyethylene.
3. A process as claimed in claim 1 wherein component (A) is polypropylene.
4. A process as claimed in claim 1 wherein component (A) is polybutylene.
5. A process as claimed in claim 1 wherein component (A) is a styrene polymer.
6. A process as claimed in claim 1 wherein component (A) is polystyrene.
7. A process as claimed in claim 1 wherein component (A) is a copolymer of styrene with up to 50% by weight of a monomer selected from the group consisting of butadiene, isoprene, acrylic acid, methacrylic acid, acrylonitrile, acrylamide, methacrylamide, acrylic and methacrylic acid esters of 1 to 13 carbon atom alkanols, vinyl chloride, vinylidene chloride, vinyl acetate, vinyl propionate, α-methyl styrene, vinyl isobutyl ether and vinyltoluene.

References Cited by the Examiner

UNITED STATES PATENTS

| 2,694,692 | 11/1954 | Amos et al. | 260—880 |
| 2,888,424 | 5/1959 | Precopio et al. | 260—827 |
| 3,093,255 | 6/1963 | Mesrobian et al. | 260—857 |
| 3,170,004 | 2/1965 | Farago | 260—873 |

FOREIGN PATENTS

| 598,310 | 5/1960 | Canada. |
| 1,224,392 | 2/1960 | France. |
| 679,562 | 9/1952 | Great Britain. |

MURRAY TILLMAN, *Primary Examiner.*

LEON J. BERCOVITZ, *Examiner.*

J. W. SANNER, E. J. TROJNAR,
*Assistant Examiners.*